Jan. 22, 1952   G. E. ARMINGTON   2,583,197
TWO-SPEED POWER STEERING
Filed May 15, 1946   7 Sheets-Sheet 5

INVENTOR
GEORGE E. ARMINGTON
ATTORNEYS

Patented Jan. 22, 1952

2,583,197

UNITED STATES PATENT OFFICE 2,583,197

TWO-SPEED POWER STEERING

George E. Armington, South Euclid, Ohio, assignor to The Euclid Road Machinery Co., Euclid, Ohio, a corporation of Ohio Application May 15, 1946, Serial No. 669,907

11 Claims. (Cl. 180—79.2)

This invention relates to improvements in booster steering mechanism and more particularly to power operated steering apparatus adapted to be operated either faster or slower as will appear.

This application is a companion to my copending application Serial No. 669,906, filed of even date herewith, now Patent No. 2,557,066, granted June 19, 1951. In the present application, all claims are directed to control and operating means for a two-speed steering mechanism of servomotor form. The invention of the claims is described as applied for use with a booster servomotor positioned approximately at right angles to the steering servomotor. In my copending application, Serial No. 669,906, all claims involve or include the booster servomotor, where the steering is accomplished at either one or two speeds.

An object of the present invention is to provide means for producing a relatively slow steering effect so long as the steering wheel or lever calls for a steering movement which is either of small angular extent or should be applied slowly, and to provide a more rapid steering effect when the steering wheel or lever calls for a steering movement either of greater angular extent or which should be applied rapidly.

Another object is to provide improved steering mechanism including a fluid pressure operated servomotor, together with two sources of supply therefor and control means therefor adapted and arranged upon motion of said control means below a predetermined limit to render one of said sources effective upon the servomotor and upon motion beyond said limit to render the other effective.

Another object is to provide improved steering mechanism in which the steering effect is produced by the effort of two servomotors, operatively associated with the tractor and trailer to produce like steering effect by the operation of either servomotor, together with operator actuated control means arranged and adapted upon motion below a predetermined limit to render said servomotors effective for normal or low speed steering, and upon motion beyond that limit to render them effective to accelerate the steering motion.

Another object is to provide improved steering mechanism including two fluid pressure servomotors, and controlling valve mechanism, operable by the operator, said mechanism being adapted to vary the rate of turning or steering motion to accommodate the vehicle either to long gradual or short sharp road turns.

Further objects of the invention in part are obvious and in part will appear more in detail hereinafter.

In the drawings, which represent one suitable embodiment of the invention.

Fig. 15 is a similar view, illustrating valve 50 in its operating position assumed when the steering effect has been to the right (crank at 107b), and with valves 48 and 49 adjusted to their left-hand low speed steering positions;

Fig. 16 is a view taken along the line 16—16 of Fig. 7, with the driver's seat and steering mechanism omitted to more clearly show the hitch; while

Figure 1:
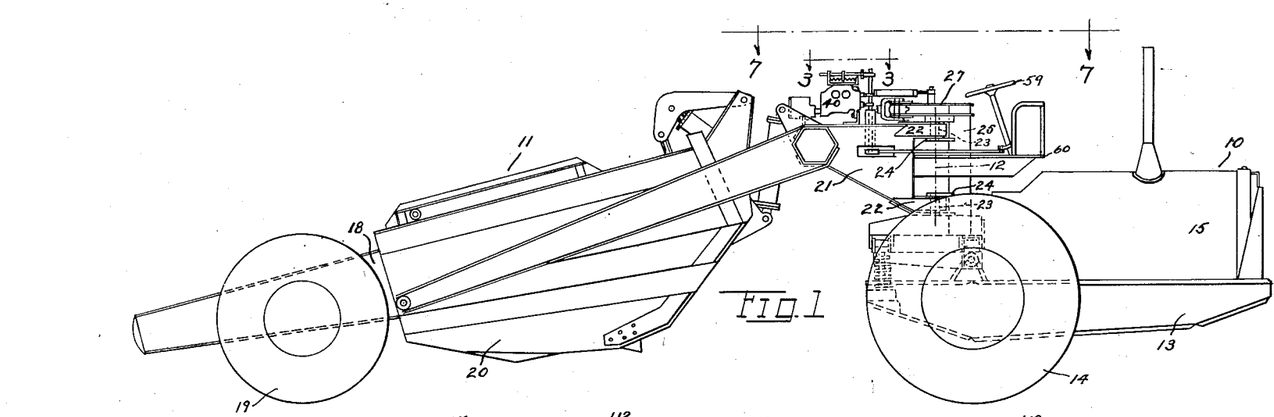
Fig. 1 is a side elevation of the complete apparatus.
Figure 7:
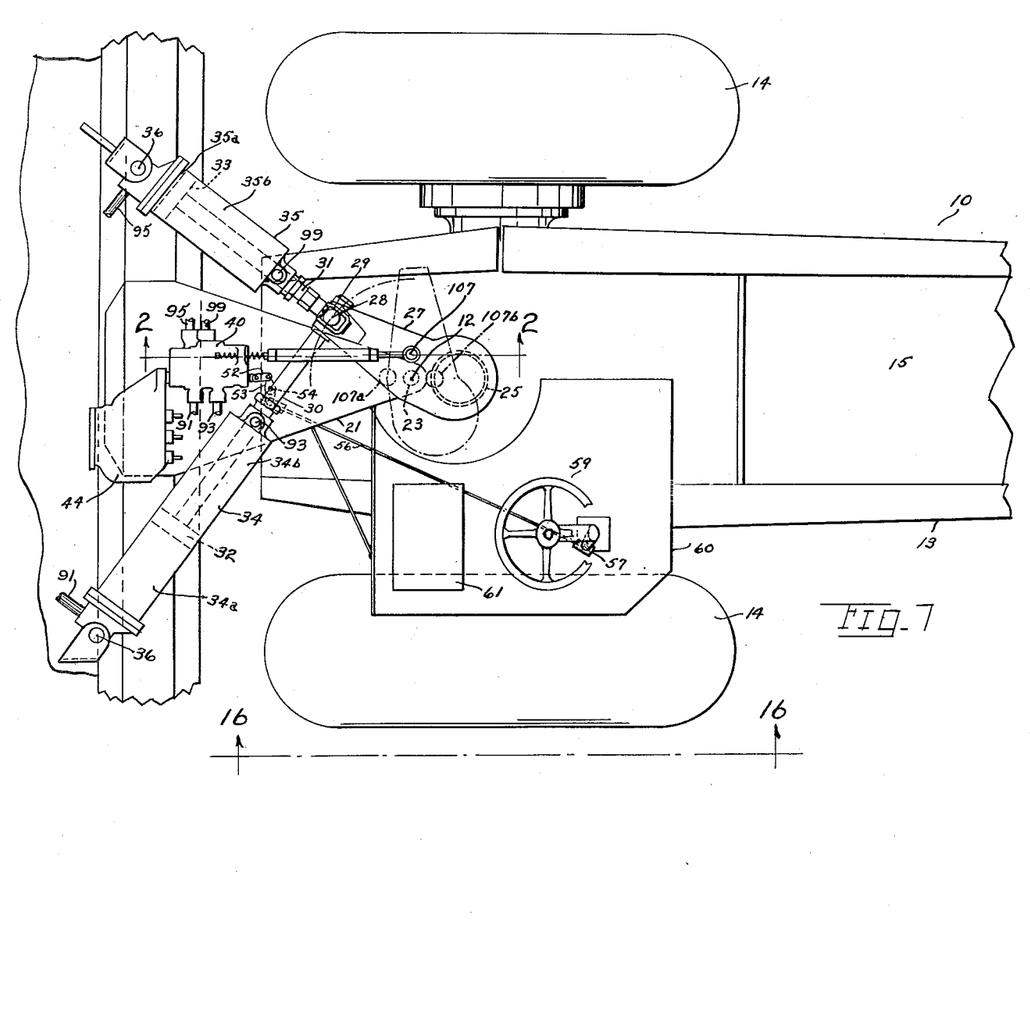
Fig. 7 is a plan view from the position of line 7—7, Fig. 1, illustrating the steering servomotors and the controlling devices therefor.
Figure 8:
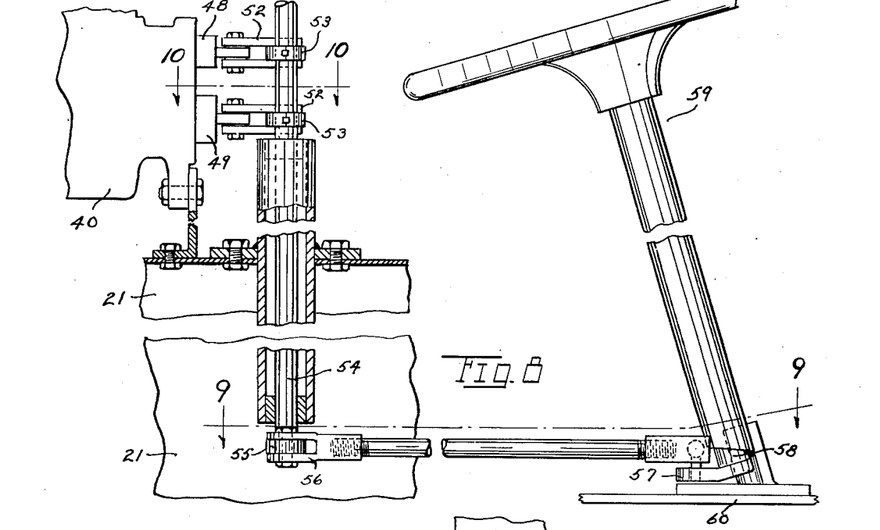
Fig. 8 is a portion of Fig. 1 enlarged and with portions in section to more clearly show the construction.

While apparatus embodying the invention may take a variety of forms, for purposes of illustration, and in no sense of limitation, the invention has been illustrated in the form of earth moving apparatus including a tractor 10 and a trailer 11, both of more or less rigid form, pivotally connected to turn relatively to each other about a vertical axis indicated by the line marked 12 in Fig. 1 and indicated as a point in Fig. 7, this axis of course being at the hitch.

Figures 5, 6:
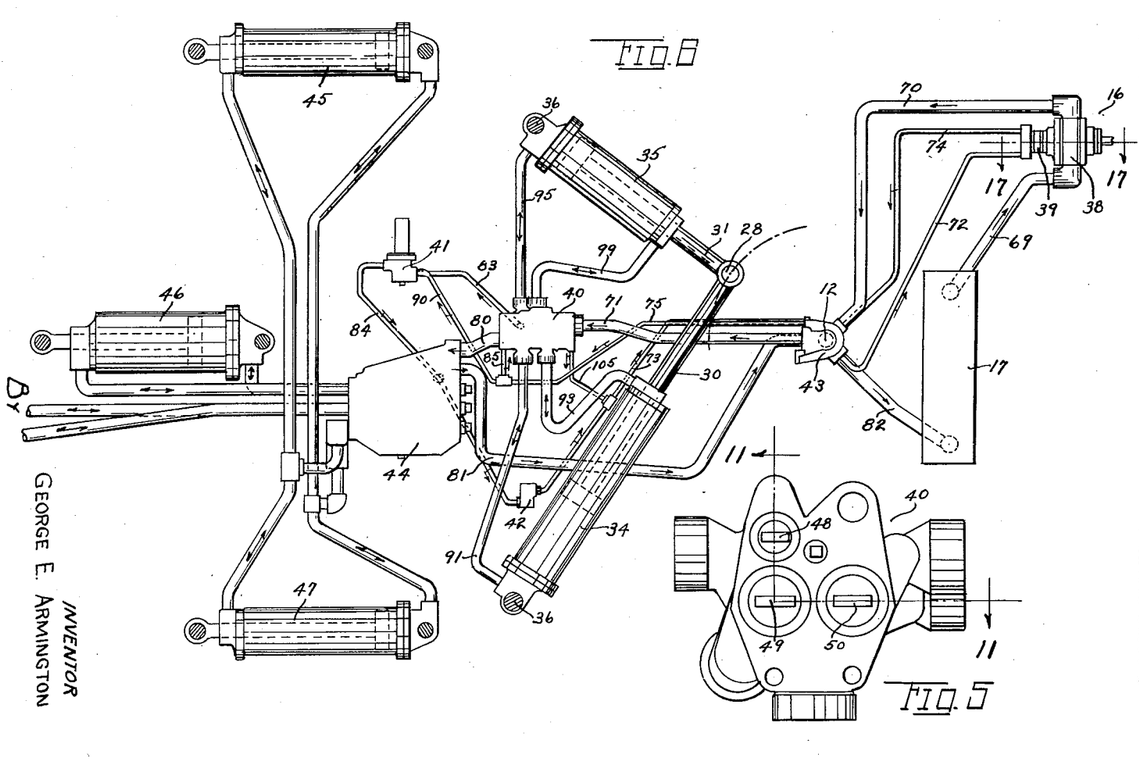
Fig. 5 is a detail end elevation of the controlling valve device.
Fig. 6 is a plan view, partly diagrammatic, illustrating the hydraulic operating system.

The tractor may be of any suitable form but is shown as including a frame or chassis 13 mounted upon wheels 14 and supporting in advance of said wheels the usual driving or operating motor 15, which overhangs or projects forward beyond the tractor axle and thus assists in balancing the load of the trailer and producing good tractive effect of the driving or hauling wheels 14 upon the road. As shown in Fig. 6 the tractor may also support a pump unit, marked 16, and a tank or reservoir 17 forming part of the hydraulic operating mechanism, as will appear more fully hereafter, such arrangement enabling the pump unit readily to be operatively connected to motor 15 as will be readily understood.

Figures 15, 16:
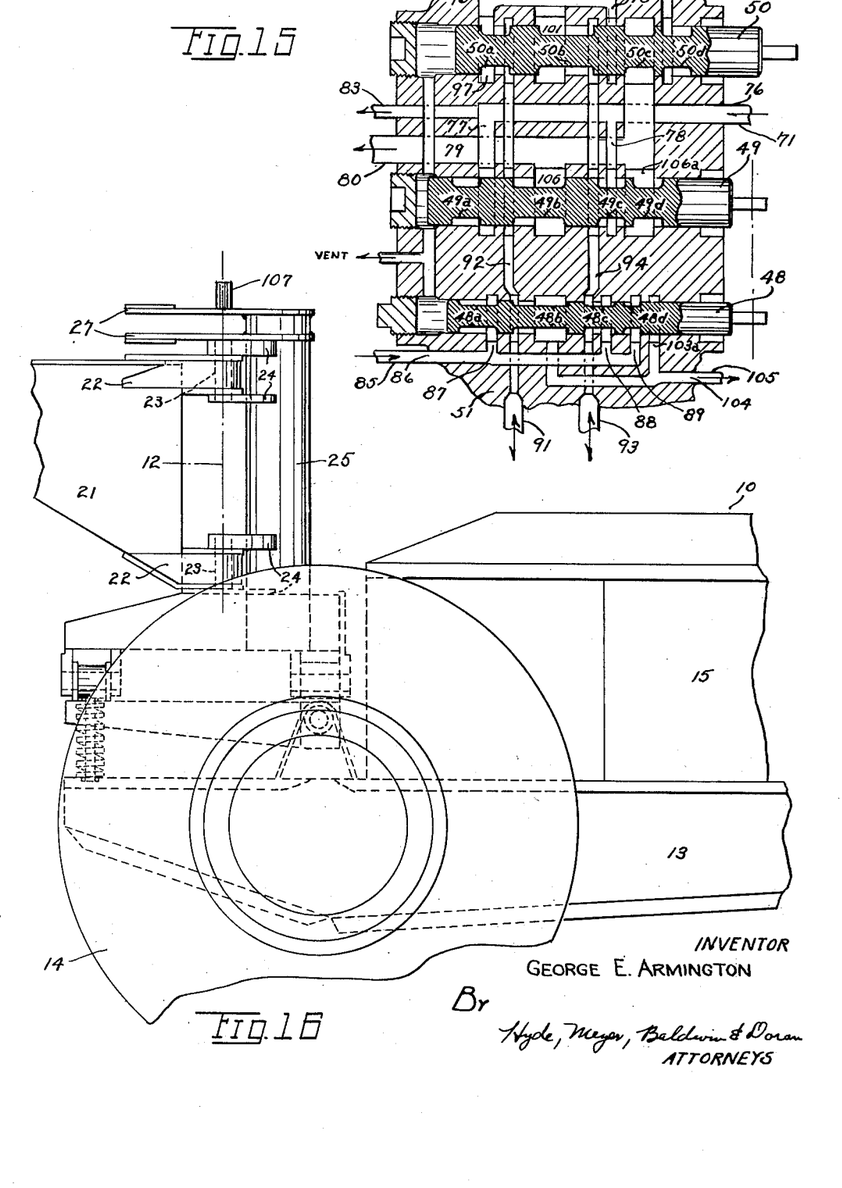

The trailer 11 includes a chassis or frame marked generally 18 supported upon wheels 19 and carrying a scoop form body 20 which, in this case, is usually of relatively large capacity, holding up to twenty or more yards of earth, representing a heavy load of many tons. The body is supported between the wheels 19 and a forwardly projecting drawbar portion 21 of the chassis, the forward end of which is provided with projecting brackets or arms 22 pivotally connected at the hitch axis 12, as by pins 23, to arms or brackets 24 on a tubular post or pillar 25 fixedly mounted on the chassis of the tractor, as shown in Figs. 1 and 16. At its upper end this post is provided with an operating crank arm 27. The details of the hitch connection form no part of the present invention but are described in detail in my copending application Serial Number 666,650, filed May 2, 1946, now Patent No. 2,460,725, granted Feb. 1, 1949, to which reference may be had for further description. It is sufficient to state here that turning of post 25 about axis 12 causes chassis 13 to turn with it.

Both the wheels 14 on the tractor and 19 on the trailer are of the nonsteering variety, having no turning steering movement with respect to either the tractor or the trailer, steering being accomplished entirely, in this instance, by relative movement, bodily, of the tractor and trailer with reference to each other about the vertical axis 12 at the hitch.

The mounting of the scoop body 20 in advance of wheels 19 and heavier toward the front end of the trailer, when the body is loaded, provides a relatively heavy trailer mass or weight which acts more or less as a stable fulcrum or anchor, with reference to which the tractor is turned during the steering operation.

Relative steering swing between tractor and trailer may be produced in any suitable manner, but in the arrangement shown is secured from a power driven device by operating connections effective upon the crank arm 27. As illustrated more particularly in Fig. 7, crank arm 27 is provided with a crank pin 28 to which are connected yokes 29 on the piston rods 30, 31 of pistons 32, 33 of primary and booster double acting servomotors or jacks, 34, 35, respectively, both of double acting hydraulic form and mounted at their rear ends to turn upon pivots 36 on the frame 18.

The advantages of this invention may be realized in connection with other power steering arrangements. For instance, this invention might be applied to the device shown in my copending application Serial Number 587,365, filed April 9, 1945, for Booster Steering Device, now Patent No. 2,403,325, granted July 2, 1946, by substituting valves 48 and 49 of the present application for valve 34 of the said copending application.

Piston 32 of the first or primary motor is actuated by the supply of fluid, such as oil under pressure, to and from its chambers 34a, 34b, and piston 33 is actuated by supply to and from its chambers 35a, 35b.

The hydraulic system includes a tank or reservoir 17, large and small pumps 38, 39 forming part of the pump unit 16, controlling valve devices for the servomotors 34, 35, housed as a unit in a casing 40, Fig. 5, a pressure limit or relief valve 41, a check valve 42 and a swivel joint 43, all interconnected by pipes or conduits later to be referred to.

The same hydraulic system may include valve devices in a valve unit 44 communicating by conduits with servomotors 45, 46, 47, which may be employed for various purposes in operation of the scoop body, such as for raising and lowering the same, for operating the front apron or ejector gate thereof, or for like purposes, and which form no part of the present invention and therefore require no detailed description.

While the control mechanism used for steering purposes may be mounted either on the tractor or trailer, in the present system substantially all the parts thereof are mounted upon the trailer, thus simplifying the mechanism, because the only connections in the hydraulic system which cross the swing joint between tractor and trailer are conduits, portions of which may be made of flexible tubing where the axis of swing is crossed, but in the present instance they pass through the swivel joint 43, located on the axis 12.

In the present steering mechanism, operated as it is by fluid pressure, the controlling devices are actuated by the operator by means of a steering wheel, lever or other device of usual form, and include valve devices which may be actuated to produce a steering effect, to wit, relative steering swing between tractor and trailer. In the present instance, I have described my invention in connection with a special arrangement of two jacks 34 and 35 positioned substantially at right angles as is more clearly shown and described in my copending application, Serial Number 669,906, filed May 15, 1946, but it will be understood that my invention will work with but one steering jack as mentioned above.

The specific valve devices shown include what may be called a small valve, which alone is rendered effective during slow speed steering, and a second or large valve, which is rendered effective for the purpose of producing rapid or high speed steering motion. Both valves are actuated by the steering wheel or other controlling device, and whether one or both valves become effective depends upon the amount of motion imparted to the steering wheel. The controlling valve devices also include an automatic valve, sensitive to or actuated by relative motion between tractor and trailer, or responsive to their relative positions, and which takes care of necessary reversal of a booster servomotor as the crank which it operates moves to one side or the other of a dead center, as appears more in detail in my above-mentioned copending application, Serial Number 669,906, filed May 15, 1946.

The controlling valve devices are shown conventionally in Figs. 11 to 15 inclusive, which represent different positions of the valves for producing different effects. These views do not illustrate the actual passageways and ports in casing 40 but conveniently understood diagrams. For convenience in description the three valves, together with the ports and passages which they control, will be described in advance of description of their manner of operation.

The valve devices include a small valve 48, a large valve 49, both operator operated, and an automatic valve 50, each in the form of an annularly grooved cylindrical piston valve slidable back and forth in an opening in the housing or body 51 of valve unit 40. The lands and grooves of each valve member cooperate with the surrounding annular lands and grooves in the valve body, the several body grooves communicating with channels or passages leading to and from various devices, as is customary in this type of valve, and as will appear more in detail hereinafter. Valves 49 and 50 are alike. Valve 48 is of similar form but of lesser diameter.

Figure 11:
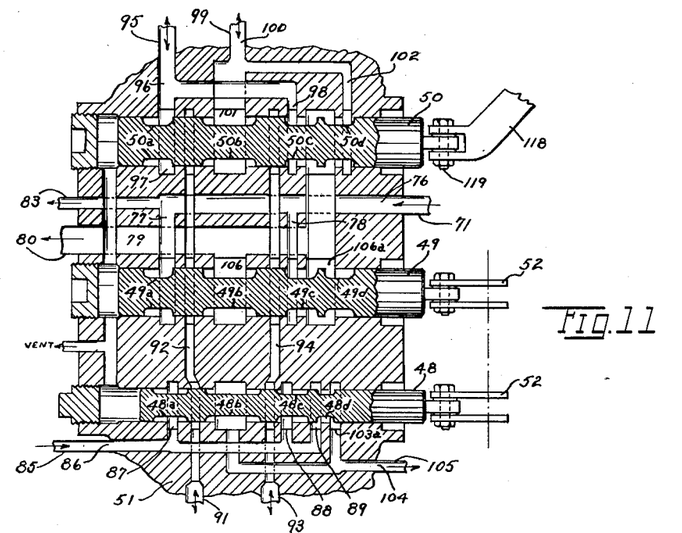
Fig. 11 is a diagrammatic view, substantially a conventionalized section on the line 11—11, Fig. 5, illustrating the steering valves and the automotic control valve, and a part of the operating connections therefor, the parts being shown in neutral position.

Valve 48 is provided with four annular grooves or channels marked, respectively, 48a, 48b, 48c, 48d, Fig. 11. Valve 49 likewise is provided with four annular grooves or channels marked, respectively, 49a, 49b, 49c, and 49d. Valve 50 is provided with four similar grooves or channels marked 50a, 50b, 50c and 50d.

Figures 2, 3, 4:
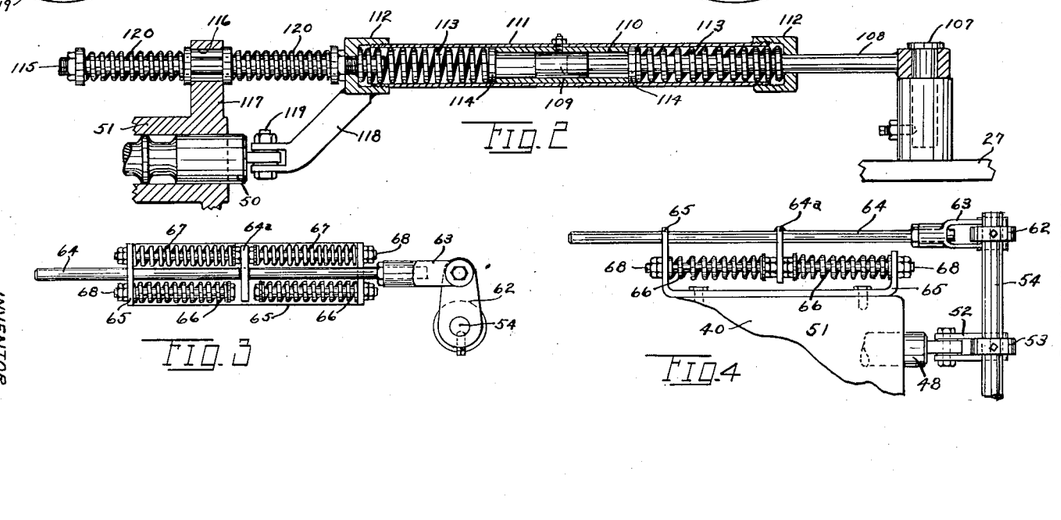
Fig. 2 is a detail sectional elevation on the line 2—2, Fig. 7, illustrating a part of the operating connections for the automatic valve.
Fig. 3 is a detail plan view from the position of line 3—3, Fig. 1, illustrating certain yielding connections in the operating mechanism for the steering valves.
Fig. 4 is a side elevation thereof.

Valves 48 and 49 are connected by links 52 to arms 53 on a vertical shaft 54 having another arm 55 connected by a long link 56 to an arm 57 on a shaft 58 provided at its upper end with a manually operable operating device, such as the steering wheel 59. This steering wheel, and the usual post in which its shaft is mounted, are supported upon a platform 60 mounted on the trailer and supporting the driver's seat 61, conventionally indicated in Fig. 7. The shaft 54, before referred to, is also provided with another arm 62, Fig. 4, connected by a clevis 63 to a rod 64 slidable in a bracket 65 mounted on the valve casing 51 and which supports four compression springs, two marked 66 and two marked 67, mounted on rods 68 carried by arms of the bracket 65. Rod 64 is provided with a depending arm or plate 64a lying between the inner ends of the rods 68, those rods which support springs 66 being shorter than those which support springs 67, as shown in Fig. 3.

The result is that, assuming the steering wheel in normal or neutral position, with the tractor and trailer in line with each other and traveling along a straight road, upon movement of the steering wheel in either one direction or the other, both the small and large valves 48 and 49 are moved together in one direction or the other. During the initial or early stage or zone of motion of the steering wheel, one of the springs 67 is compressed until the head on the longer rod which carries it is pushed back far enough so that plate 64a engages the head of the shorter rod 68 besides it. Thereupon spring 66 begins to be compressed, and from that point on, or throughout this second zone of motion, both springs are compressed. The initial motion, through the first zone requiring less effort by the operator, renders only the small valve and its small capacity pump effective, for slow speed steering, while the additional motion, through the second zone, renders the large valve and its greater capacity pump effective, for high speed steering. When the operator encounters the additional resistance of a spring 66, he knows that both valves and both pumps are becoming effective for high speed steering. When the operator releases the steering wheel the springs 66, 67 return the valves and wheel promptly to neutral position. Of course, graduating effects may be secured by adjustment of the valves to various intermediate positions in either of said zones.

Fig. 7 illustrates the operating parts in neutral position, where the tractor and trailer are in line, traveling along a straight road. Piston 32 of primary servomotor 34 is in mid position, from which it advances for steering to the right and is retracted for steering to the left, in both cases working at maximum efficiency, with due respect for the sine law. The piston of booster motor 35 however is fully retracted, because that motor is on dead center with respect to the crank axis 12, as a consequence of which it is necessary to reverse the flow of fluid to the two chambers 35a, 35b of the booster motor as the crank which it operates moves back and forth across dead center. The valve mechanism 50 includes an automatic device to take care of this reversal, as will later appear.

Figures 9, 10, 17:
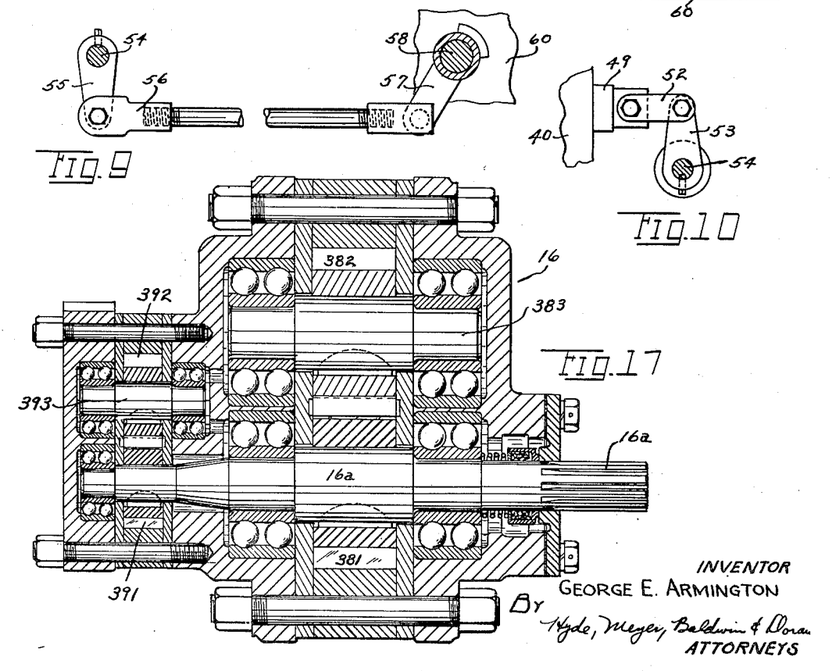
Fig. 9 is a fragmental sectional view taken along the line 9—9 of Fig. 8.
Fig. 10 is a fragmental sectional view taken along the line 10—10 of Fig. 8.
Fig. 17 is an enlarged sectional view of the pump taken along the line 17—17 of Fig. 6.

The dual pump unit 16 of Fig. 6 is more clearly shown in Fig. 17. Shaft 16a is provided with a suitable driving connection with motor 15. Rotatable with this shaft is gear 381 which meshes with gear 382 on shaft 383, which in turn is rotatably mounted in the housing. Gears 381 and 382 provide a pump of relatively large capacity, say, sixty-five gallons per minute. In a separate chamber of the housing, shaft 16a rotates gear 391 which meshes with gear 392 on shaft 393, which in turn is rotatably mounted in the housing. Gears 391 and 392 provide a pump of relatively small capacity, say, ten gallons per minute.

Referring now to Fig. 6, which diagrammatically illustrates the complete hydraulic system, pump 38, which is of relatively large capacity, is connected on its suction side by conduit 69 with the tank or reservoir 17, and on its discharge side, by conduit 70 and a suitable passage in swivel joint 43, and conduit 71, with the controlling valve unit 40. In a similar manner the pump 39, which is of the same type but of smaller capacity than pump 38, communicates on its suction side, by way of conduit 72 and another suitable passage in swivel unit 43, with a conduit 73, and on its discharge side, by way of conduit 74 and the swivel joint, with a conduit 75, conduits 73 and 75 being later referred to.

Referring also to Fig. 11, supply pipe 71 from the large pump communicates with a passage 76 in the valve body, having two branches 77, 78. The valve body is also provided with a large outlet passage 79 communicating by pipe 80 with controlling valve unit 44, which is connected to a return pipe 81 communicating, by way of a passage in swivel joint 43 with a drain pipe 82 leading to the reservoir 17. Passage 77 communicates by pipe 83 with the pressure limiting or release valve 41 from which a return conduit 84 leads to the check valve 42 which communicates, on its opposite side, with the conduit 73 before referred to.

The supply pipe 75, coming from the small pump, communicates by pipe 85 with a passage 86 in the valve body, having three branches marked respectively 87, 88, 89, Fig. 11, and by way of pipe 90 with relief valve 41, where liquid flowing through the small pump system joins that flowing through the large pump system.

Primary servomotor 34 is connected to the controlling valve mechanism by two conduits, to wit, conduit 91 leading from chamber 34a to a passage 92 in the valve body, and conduit 93 leading to a passage 94 in the valve body. Similarly chamber 35a of the booster motor communicates by pipe 95 with a passage 96 in the valve body having two branches marked respectively 97, 98, while chamber 35b communicates by pipe 99 with a passage 100 having two branches marked respectively 101, 102.

Booster servomotor 35 is not essential and in some cases may be omitted, in which case, of course, conduits 95 and 99 and their connecting passages 96 and 100 with their branches, and automatic valve 50 will be omitted, and, for convenience, the control mechanism will be described first, as though that were the case.

In operation pumps 38 and 39 operate continuously, a supply of oil being delivered by each of them to the appropriate supply passages 76, 86 in the controlling valve unit 40. Such oil as is required for actuation of a servomotor piston enters its active motor chamber, the oil from the inactive chamber flowing on to be returned to the pump or other reservoir, it being understood that relief valve 41 is loaded to maintain any desired pressure in the system.

Fig. 11 illustrates all parts in neutral or normal position, as when the vehicle is traveling along a straight road and the operator has permitted the steering wheel to return to neutral position.

The passage 86, supplied by the small pump, communicates by branches 87, 88 with channels 48a, 48c which are lapped or closed in the valve body. Branch 89, however, communicates by channel 48d with a branch 103a of passage 104 communicating by pipe 105, Fig. 6, with the return conduit 73 for the small pump system. Passage 76, which supplies a larger quantity of oil from the large pump, communicates by its branch 77 with channel 49a which is lapped or closed and by its branch 78 and channel 49c with a branch 106a of passage 79, which communicates with the conduit 80 before referred to, for returning the oil from the large pump system to the reservoir, by way of valve 44, conduit 81, etc., and with the relief valve 41 by way of conduit 83. Passages 92, 94 are lapped or closed. As a result, the primary servomotor 34 is inactive, its piston remaining stationary, and the pumps continue in operation, circulating oil against the pressure of the relief valve without effect upon the steering mechanism.

Let it be assumed that, at a time when the steering effect has been to the left, the operator desires either to straighten up or turn to the right. Valve 50, therefore, is in its extreme left position, Fig. 12, for reasons which will later appear. The operator turns the steering wheel to the right, or clockwise, Fig. 7, which simultaneously advances the small and large valves 48, 49 to the right in Fig. 11 to the positions shown in Fig. 12. For slow speed steering the steering wheel is moved only a short distance, as described in my copending application, Serial No. 669,906, only sufficient to compress a spring 67, or until the plate 64a engages one of the rods 68 supporting a spring 66, but without compressing the latter spring.

So long as the operator holds the wheel over in its new position, steering effort is applied to produce swinging motion of the tractor with reference to the trailer, or of the two with reference to each other, by causing flow of oil as follows:

The large pump is not effective. Branches 77 and 78 from its supply passage 76 are lapped or closed, so that its oil stream flows to the relief valve and thence back to the reservoir. The small pump however is effective, its oil supply flowing from passage 86 by way of branch 87 and channel 48a to passage 92 and thence by way of conduit 91 to chamber 34a. Chamber 34b is in communication, by conduit 93, with passage 94, which is connected by channel 48b with a branch of passage 104, for returning the oil supply to the small pump.

The result is the advance of piston 32 in the cylinder of the primary motor, the rod of which turns crank 27 clockwise in Fig. 7, about the hitch axis, 12, and the vehicle is steered to the right. The steering effect is cumulative, building up by further relative motion between tractor and trailer, until the parts can go no further, or until the operator relieves his pressure on the steering wheel and said wheel and the other steering parts return to their neutral positions, under the influence of springs 67, as described.

If the road turns sharply to the right, as upon a short bend, requiring rapid or sudden relative steering motion between tractor and trailer, or should the curvature of the roadway, already gradual, suddenly increase, requiring like effect, then the operator swings the steering wheel further to the right, sufficient to not only move the plate 64a against the heads of the short rods 68, but enough to actually compress the shorter springs 66. Such an effort moves the valves 48, 49 to the positions shown in Fig. 13, the high speed steering position of my copending application. Now the motion of the piston in the servomotor 34 is produced by oil flow as follows:

From small pump passage 86 and its branch 87 by way of channel 48a to passage 92 and thence to chamber 34a. A larger supply of oil also flows from large pump passage 76 and its branch 77 by way of channel 49a to the passage 92. From the chamber 34b on the opposite side of said piston oil flows by way of passage 94 and channel 49b to passage 106 and thence to discharge, and by channel 48b to passage 104 and thence to discharge.

Thus, by the first increments of motion of the steering wheel to the right, the relative steering motion between tractor and trailer is produced at relatively low speed by the effect of the small pump alone, but when the steering wheel is advanced sufficiently so that both of the springs 66 and 67 are compressed, the same steering motion is effected more rapidly by a greater supply of oil coming from both the small and large pumps. In both cases the discharge openings from the chamber on the inactive side of the piston are in proportion to the quantity of oil flow. In both cases the effect can be graduated by intervening positions of the steering wheel, which adjust valves 48 and 49 to various positions so that their annular grooves or channels open the valve ports and passages to greater or lesser degree.

Figure 14:
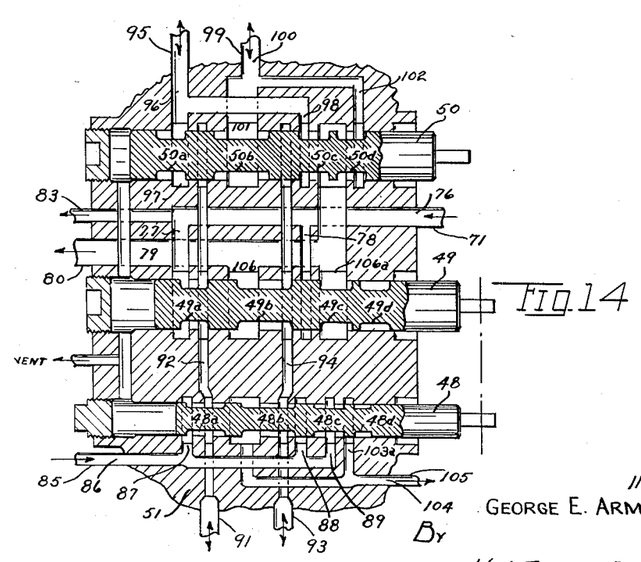
Fig. 14 is a similar view, illustrating valve 50 in its neutral position and valves 48 and 49 in their right-hand high speed steering positions.

Of course, as the vehicle straightens up, as upon a straight road, valve 50 returns to its neutral position, as shown in Fig. 14, due to motion of crank 27, as will later appear.

Steering motion in the opposite direction, to the left, while the vehicle is turning to the right, is accomplished by turning motion of the steering wheel in the counterclockwise direction, Fig. 7, with corresponding adjustment of valves 48 and 49 to the positions shown in Fig. 15, and with like effects, but effective to produce pressure in chamber 34b, which becomes the active chamber instead of chamber 34a. Here valve 50 is in its right-hand position, because crank 107 has moved beyond the neutral zone and is assumed to be at position 107b. The vehicle is traveling to the right.

When the steering system includes the second or booster motor 35, automatic valve 50 is required, with operating connections therefor as shown in the drawings. The purpose of booster motor 35 is to offset the reduction in turning torque, around the steering axs 12, of the steering motor 34, the two motors 34, 35 being so disposed, relatively to each other and with reference to said axis, that in either direction of steering turn an increase or reduction in torque of the steering motor 34 is offset or equalized by corresponding reduction or increase in torque of the booster motor. That is true, of course, only when crank 107, later referred to, moves in one direction or the other an amount sufficient to actuate valve 50. Valve 50 not only serves to connect the chambers of the booster motor 35 to those of the motor 34, so that the two operate in parallel or with cumulative effect, as it were, during both low speed and high speed steering, but also in a manner to reverse the two chambers of the booster motor 35 as the crank operated thereby passes to one side or the other of the dead center. This requires special operating connections for valve 50, as shown and described in my copending application Serial Number 669,906, filed May 15, 1946.

As shown in Figs. 2 and 7, the crank arm 27, to which turning effort is applied for producing steering motion, is provided with a crank pin 107, Fig. 7, to which is connected one end of a rod 108, Fig. 2, provided with a head 109 traveling back and forth within a short sleevelike insert 110 in a long tube 111, provided at both ends with caps 112. In extreme ends of said tube 111 are located compression springs 113 each seated at one end against a cap 112 and at the opposite end against a washer 114, one of which surrounds rod 108. To the far end of the tube 111 is secured an extension rod 115 loosely slidable in an opening 116 in a bracket extension 117 of the body 51 of the valve unit 49, just above the automatic valve 50. An arm 118 welded to the cap 112 extends downwardly and is pivotally connected by a pin 119 to the end of the valve 50. On the rod 115, one on either side of bracket 117, are compression springs 120.

As the crank 27 is turned to one side or the other from its neutral position, the crank pin 107, shown in full lines in Fig. 7 in its neutral position, moves to one or the other of the positions shown in dotted lines in said view at 107a or 107b. That motion of pin 107 causes longitudinal motion of rod 108. The position of the automatic valve 50, therefore, always depends upon the position of crank 27 and never upon a direct effort of the operator.

Fig. 2 shows the parts in neutral position, the head 109 lying midway between the two washers 114. The first increments of motion of the crank pin 107 from its neutral position, cause the head 109 to slide idly within tubes 111, 110, until a washer 114 is encountered. During this zone of motion, a few degrees on either side of the dead center, the position of valve 50 is unaffected. It remains in neutral position, as shown in Fig. 11. But, as the crank 27 is moved further, the head 109 moves further, carrying with it the washer 114, the tubes 110 and 111, arm 118 and valve 50, which is promptly moved in one direction or the other, either to its extreme left-hand position shown in Fig. 13 corresponding to crank pin position 107a, or to its extreme right-hand position shown in Fig. 15 corresponding to crank pin position 107b, with compression of one or the other of springs 120. After the valve has been thus fully moved, further motion of crank 107 merely compresses one or the other of springs 113, without further valve motion, those springs being provided merely for the purpose of securing lost motion of crank 107, when necessary, beyond the point where valve 50 has been fully shifted.

In neutral position of valve 50, when the crank of booster motor 35 is on dead center, as in Fig. 7, such neutral position being shown in Fig. 11, the vehicle is traveling directly forward in a straight line. The passages 96 and 100 are lapped or closed in the channels 50a, 50b, but are cross-connected at channels 50c, 50d by passage 106a, leading to the discharge passage 80, all communicating with the large pump supply passage, according to the position of valve 49. Thus, so long as crank 27 is within a few degrees of its dead center position, the two chambers 35a, 35b are cross-connected and the piston of booster motor 35 is ineffective and is moved idly by crank pin 28.

Figure 12:
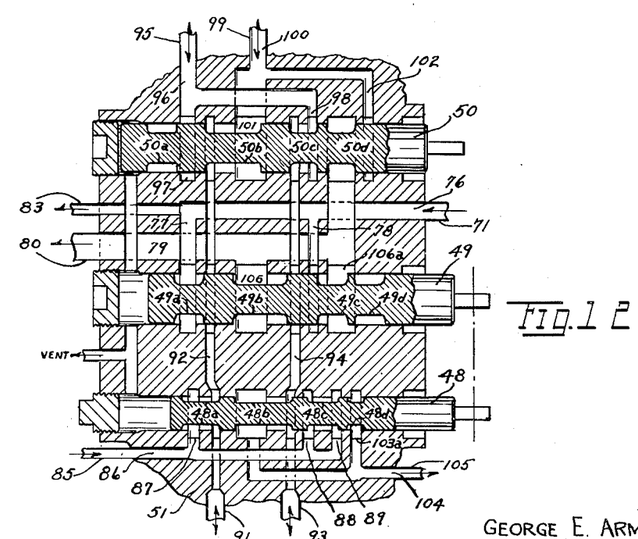
Fig. 12 is a similar view, with the operating connections omitted, valve 50 being shown in its operating position assumed when the steering effect has been to the left (crank at 107a) and the valves 48 and 49 are in their positions assumed when the operator has adjusted them for slow speed steering to the right.
Figure 13:
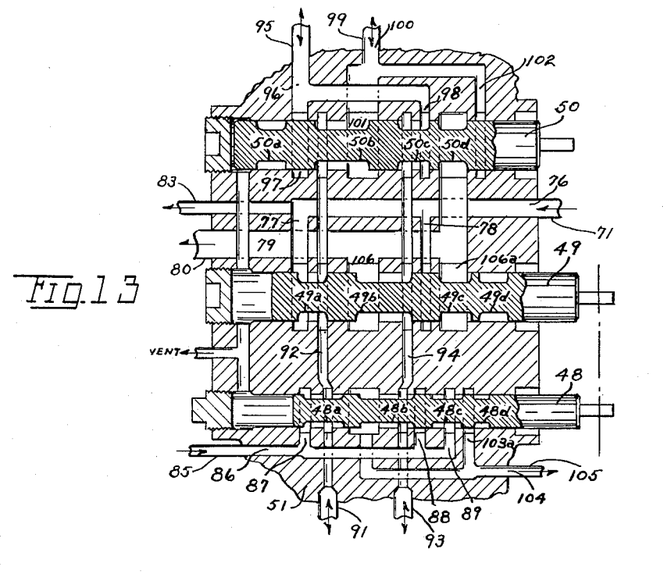
Fig. 13 is a similar view, with valve 50 in the same position and valves 48 and 49 adjusted for high speed steering to the right.

When the crank pin 107 is in the dotted line position marked 107a, Fig. 7, the valve 50 is in its left-hand position shown in Fig. 12. In the position shown in Fig. 12 the vehicle is actually turning to the left, because crank arm 27 has been moved counterclockwise in Fig. 7, but the steering effect of valves 48, 49 is to the right. Passage 92, which communicates with chamber 34a of the primary motor, is connected by means of channel 50b with the passage 101 communicating with chamber 35b of the booster motor. At the same time, channel 94, connected to chamber 34a, communicates by channel 50c with chamber 35a. Thus, the propulsive effort of the piston in cylinder 34 is in one direction, say outward, while the propulsive effort of the piston in cylinder 35 is in the opposite direction, say inward.

When the crank pin 107 reaches a position on the other side of the dead center, say as indicated at 107b, Fig. 7, valve 50 is in its extreme opposite direction, or at the right, as shown in Fig. 15, and the vehicle is turning to the right, but the steering effect is to the left. And, it will be apparent, chamber 34a now communicates with chamber 35a, and chamber 34b with chamber 35b. Thus, in this case, the propulsive efforts in the two cylinders are now in the same direction.

The result of all of the foregoing is that when both primary and booster steering motors are employed, with operating mechanism as illustrated, the operator steers the tractor and trailer by turning the steering wheel in one direction or the other. Within a zone including a few degrees in either direction from neutral, the jack 35 is out of commission, as it were, its piston being moved idly by the operative effect of the crank pin 107 or crank 27. In this zone steering effect is produced by the primary motor alone, with the supply of oil coming either from the small pump alone, during low speed steering, or from both pumps, if the steering wheel has been pushed far over and high speed steering is required. As the steering effect, i. e., the angular relation between tractor and trailer, increases, valve 50 is automatically operated, by motion of crank 107, to connect the chambers of the booster cylinder into the fluid pressure system, and this always is with due regard for whether the crank operated by the booster cylinder is on one side or the other of its dead center.

It, of course, will be understood that in this steering mechanism, steering is not accomplished by turning the steering wheel in one direction or the other, through an angle, the magnitude of which determines the total amount of steering turn, and then leaving the wheel there, leaving it to the steering parts to produce the steering effect. The steering here is accomplished by one or more impulses, the number and extent of which are selected to produce the desired effect. In other words, assuming slow speed of travel of the vehicle, if a slow gradual turn in the road requires that kind of steering, the operator turns the wheel over only a few degrees, holds it there for possibly only a second or less, and immediately returns the wheel, or lets it return to neutral position, repeating the operation if the steering swing is not sufficient. Likewise, if a short extensive turn, such as a right angle bend in the road, requires that kind of steering, the operator swings the wheel in the proper direction through a wide angle, so as to bring high speed steering into operation, promptly returning the wheel, or permitting it to return, to neutral position, and repeating the impulse if sufficient effect is not secured. In either case, when the steering turn progresses to an amount which produces motion of valve 50, the booster cylinder automatically comes into operation. Thus, the operator has all parts of the mechanism within his control and by manipulations of the steering wheel, either short or long, and held long enough or repeated frequently enough, produces any kind of steering effect he desires.

Of course the primary cylinder motor 34 is most efficient when crank pin 28 is in the position shown in Fig. 7, and its efficiency decreases the further said crank departs from that position. But, as it departs, the control valve 50 throws the booster cylinder into operation, with an effect which increases or becomes more efficient as the effect of the primary cylinder decreases. Thus, substantially uniform propulsive effort is provided through the entire range of relative steering motion.

It should also be noted that at any time when the booster servomotor is in operation, by reason of automatic adjustment of valve 50 to either of its two operating positions, shown in Figs. 12 and 15 respectively, (crank at 107a or 107b), the valve 48, or valves 48 and 49 together, serves as manually operated control means to which the booster servomotor is subject. In other words, in both of these positions, fluid pressure never can reach and become effective in the booster servomotor unless the operator manually has adjusted valves 48, 49 to either slow speed or high speed steering position, either to the right or to the left. Booster motor 35 never can become effective alone.

Other advantages of the invention will be apparent to those skilled in the art.

What I claim is:

1. In combination, a steerable wheeled vehicle, an expansible chamber servomotor operatively connected with said vehicle to steer it, two sources of pressure fluid supply for said servomotor, one source of larger capacity than the other, an operator-controlled steering member, means responsive to motion of said member below a predetermined limit for causing connection of said source of lower capacity to said servomotor, and means responsive to motion of said member beyond said predetermined limit for causing connection of the other of said sources to said servomotor.

2. Apparatus of the character described, comprising tractor and trailer members pivotally connected together on a vertical hitch axis, a fluid pressure servomotor mounted upon one of said members and effective upon the other to produce relative steering swing between them, two sources of fluid under pressure for operating said servomotor, and controlling means therefor arranged upon limited motion to connect said servomotor to one of said sources and upon additional motion to both of said sources, for producing a steering effect at two different rates, respectively.

3. Apparatus of the character described, comprising tractor and trailer members pivotally connected together on a vertical hitch axis, a fluid pressure servomotor mounted upon one of said members and effective upon the other to produce relative steering swing between them, two sources of fluid under pressure for operating said servomotor, one of larger capacity than the other, and controlling means therefor arranged upon limited motion to connect said servomotor to the source of smaller capacity and upon additional motion to connect said servomotor to said source of larger capacity, for producing a steering effect at two different rates, respectively.

4. Apparatus of the character described, comprising tractor and trailer members pivotally connected together on a vertical hitch axis, a fluid pressure servomotor mounted upon one of said members and effective upon the other to produce relative steering swing between them, two sources of fluid under pressure for operating said servomotor, one of larger capacity than the other, and controlling means therefor arranged upon limited motion to connect said servomotor to the source of smaller capacity and upon additional motion to both of said sources, for producing a steering effect at two different rates, respectively.

5. In combination, a steerable wheeled vehicle, an expansible chamber servomotor operatively connected with said vehicle to steer it, two sources of pressure fluid supply for said servomotor, and controlling means therefor arranged upon limited motion to connect said servomotor to one of said sources and upon additional motion to both of said sources, for producing a steering effect at two different rates, respectively.

6. Apparatus of the character described, comprising tractor and trailer members pivotally connected together on a vertical hitch axis, a fluid pressure servomotor mounted upon one of said members and effective upon the other to produce relative steering swing between them, two sources of pressure fluid supply for said servomotor, one source of larger capacity than the other, an operator controlled steering member, means responsive to motion of said member below a predetermined limit for causing connection of said source of lower capacity to said servomotor, and means responsive to motion of said member beyond said predetermined limit for causing connection of the other of said sources to said servomotor.

7. Apparatus of the character described, comprising tractor and trailer members pivotally connected together on a vertical hitch axis, a fluid pressure servomotor operatively connected to one of said members and effective upon the other member for producing relative steering swing between them, two separate supply conduits, each communicating with a source of fluid pressure, and controlling valve means for the supply of fluid to said servomotor, said valve means including two sets of passages communicating respectively with said conduits and both communicating with said servomotor, said valve means being movable to two positions, one for opening one of said passages and the other for opening both of said passages, thereby to suddenly and materially vary the rate of supply fluid as the valve means move from one position to the other and thus sharply change the rate of steering swing.

8. Apparatus of the character described in claim 7, including operator operated means for actuating said valve means, and yielding means for biasing said valve means toward neutral position.

9. Apparatus of the character described in claim 7, including operator operated means for actuating said valve means, and yielding means for biasing said valve means toward neutral position, said biasing means including two springs, one only of which becomes effective when the valve means is moved to the first position and both of which become effective when it is moved to the second position, said biasing means thereby being effective to offer greater resistance to valve movement to the second than to the first of said positions.

10. Apparatus of the character described, comprising tractor and trailer members pivotally connected together on a vertical hitch axis, fluid pressure servomotor means mounted upon one of said members and effective upon the other to produce relative steering swing between them, two sources of pressure fluid of greater and lesser flow capacity respectively for operating said servomotor means, and controlling means therefor having one position for connecting one of said sources to said servomotor means and having another position for connecting the other of said sources to said servomotor means.

11. Apparatus of the character described, comprising tractor and trailer members pivotally connected together on a vertical hitch axis, fluid pressure servomotor means mounted upon one of said members and effective upon the other to produce relative steering swing between them, two sources of pressure fluid of greater and lesser flow capacity respectively for operating said servomotor means, and operator-operated control means for connecting each of said sources to said servomotor means.

GEORGE E. ARMINGTON.

REFERENCES CITED

The following references are of record in the file of this patent:

UNITED STATES PATENTS

| Number | Name | Date |
| --- | --- | --- |
| 1,358,974 | Mowbray | Nov. 16, 1920 |
| 2,164,308 | Centervall | July 4, 1939 |
| 2,347,882 | Choate et al. | May 2, 1944 |
| 2,374,410 | Brumbaugh | Apr. 24, 1945 |
| 2,403,325 | Armington | July 2, 1946 |